United States Patent
Lou

(10) Patent No.: US 11,875,814 B2
(45) Date of Patent: Jan. 16, 2024

(54) AUDIO DATA PROCESSING METHOD, APPARATUS AND DEVICE, AND STORAGE MEDIUM

(71) Applicant: BIGO TECHNOLOGY PTE. LTD., Singapore (SG)

(72) Inventor: Fan Lou, Guangzhou (CN)

(73) Assignee: BIGO TECHNOLOGY PTE. LTD., Singapore (SG)

( * ) Notice: Subject to any disclaimer, the term of this patent is extended or adjusted under 35 U.S.C. 154(b) by 373 days.

(21) Appl. No.: 17/297,866

(22) PCT Filed: Nov. 28, 2019

(86) PCT No.: PCT/CN2019/121525
§ 371 (c)(1),
(2) Date: May 27, 2021

(87) PCT Pub. No.: WO2020/108555
PCT Pub. Date: Jun. 4, 2020

(65) Prior Publication Data
US 2022/0020389 A1 Jan. 20, 2022

(30) Foreign Application Priority Data
Nov. 28, 2018 (CN) .......................... 201811436053.2

(51) Int. Cl.
*G10L 21/043* (2013.01)
*H04N 21/439* (2011.01)
(Continued)

(52) U.S. Cl.
CPC ....... *G10L 21/043* (2013.01); *H04N 21/4394* (2013.01); *H04N 21/8113* (2013.01); *H04N 21/845* (2013.01)

(58) Field of Classification Search
CPC ............ H04N 21/8113; H04N 21/845; H04N 21/4394; H04N 21/8456; H04N 21/472; G10L 21/043
(Continued)

(56) References Cited

U.S. PATENT DOCUMENTS 5,097,485 A    3/1992  O'Connor et al.
2003/0171937 A1*  9/2003  Fukumoto ............. G10L 21/038
                                                704/503
(Continued)

FOREIGN PATENT DOCUMENTS

CN    101290775 A    10/2008
CN    101640053 A     2/2010
(Continued)

OTHER PUBLICATIONS

Ivan Damnjanovic, et al.: "A Real-Time Framework for Video Time and Pitch Scale Modiciation", IEEE Transations on multimedia, IEEE, USA, vol. 12, No. 4, Jun. 1, 2010, pp. 247-256.
(Continued)

*Primary Examiner* — Melur Ramakrishnaiah
(74) *Attorney, Agent, or Firm* — George R. McGuire

(57) ABSTRACT

Provided are an audio data processing method and apparatus, a device and a storage medium. The method includes: acquiring audio data to be processed and a variable-speed rate of at least one audio frame in the audio data; sequentially using the at least one audio frame as a current audio frame to be processed, and converting the current audio frame to a frequency domain; determining a target phase signal of the current audio frame according to a variable-speed rate of the current audio frame and a variable-speed rate of a previous audio frame; and performing, according to the target phase signal, time domain conversion on the
(Continued)

current audio frame converted to the frequency domain to obtain a processed current audio frame.

20 Claims, 5 Drawing Sheets

(51) Int. Cl.
  *H04N 21/81*  (2011.01)
  *H04N 21/845*  (2011.01)
(58) Field of Classification Search
  USPC .......................................................... 700/94
  See application file for complete search history.

(56) References Cited

U.S. PATENT DOCUMENTS

2005/0010397 A1   1/2005  Sakurai et al.
2017/0238026 A1*  8/2017  Agrawal .......... H04N 21/25883
                                              725/14

FOREIGN PATENT DOCUMENTS

| CN | 101719371 | A |   | 6/2010 |   |          |
|----|-----------|---|---|--------|---|----------|
| CN | 102063919 | A |   | 5/2011 |   |          |
| CN | 102419981 | A |   | 4/2012 |   |          |
| CN | 103684487 | A |   | 3/2014 |   |          |
| CN | 104934040 | A |   | 9/2015 |   |          |
| CN | 107749302 | A | * | 3/2018 | ............ | G10L 19/02 |
| CN | 107749302 | A |   | 3/2018 |   |          |
| CN | 109448752 | A |   | 3/2019 |   |          |
| IN | 107735969 | A |   | 2/2018 |   |          |
| KR | 20150009777 | A |   | 1/2015 |   |          |

OTHER PUBLICATIONS

European Search Report, dated Dec. 1, 2012. pp. 1-3.
First Search of CN prior application, pp. 1-2.
Translated CN First Office A ction, pp. 1-6.
International Search Report Form PCT/ISA/210, and Written Opinion Form PCT/ISA/237, International Application No. PCT/CN2019/121525 pp. 1-7 International Filing Date Nov. 28, 2019 dated Feb. 29, 2020.
Non-translated Russian First Office Action, pp. 1-6.

* cited by examiner

AUDIO DATA PROCESSING METHOD, APPARATUS AND DEVICE, AND STORAGE MEDIUM

CROSS-REFERENCE TO RELATED APPLICATIONS

This is a National Stage Application filed under 35 U.S.C. 371 based on International Patent Application No. PCT/CN2019/121525, filed on Nov. 28, 2019, which claims priority to Chinese Patent Application No. 201811436053.2 filed on Nov. 28, 2018, disclosures of both of which are incorporated herein by reference in their entireties.

TECHNICAL FIELD

The present application relates to the technical field of audio processing, for example, an audio data processing method and apparatus, a device and a storage medium.

BACKGROUND

In audio data processing, it is sometimes necessary to play audio data at a rate faster or slower than an original recording rate without changing the tone, timbre and other characteristics of an original audio. This adjustment processing for the playing speed of audio data is usually referred to as variable-speed playing of the audio data.

During the variable-speed playing of the audio data, conventional methods include two types, that is, time domain variable-speed processing and phase domain variable-speed processing (also referred to as frequency domain variable-speed processing). Time domain variable-speed processing is simple in operation and is thus mainly suitable for some scenarios with strict requirements on computational complexity. The disadvantage of time domain variable-speed processing is that the audio after variable-speed processing has poor sound quality or is different from the original audio in timbre and tone. The phase domain variable-speed processing is slightly complicated in operation, but in the case of a single variable-speed rate, the phase domain variable-speed processing can keep the processed audio data with better sound quality and reduce the difference between the processed audio data and the original audio data in timbre and tone.

However, in practical application, when the audio variable-speed playing processing is performed, a situation exists where the variable-speed rate of the audio data continuously changes. For example, in a live broadcasting platform, a user selects different specific rates for the recorded multi-segment audio data to perform variable-speed playing. For example, in the process of aligning and modifying the cantata audio of a user, different variable-speed adjustment needs to be performed on different segments of audio data, and the like. For such situation, in the case where the conventional phase domain variable-speed processing combines two segments of audio data having different variable-speed rates when the variable-speed rate of the latter segment varies greatly from the variable-speed rate of the latter segment of audio data, phase and amplitude hopping is easily generated, the sound quality is thus damaged, and the playing effect of the processed audio data is thus affected.

SUMMARY

The embodiments of the present application provide an audio data processing method and apparatus, a device and a storage medium so as to solve the problem that an audio variable-speed method cannot effectively process audio data with different variable-speed rates.

The embodiments of the present application provide an audio data processing method. The method includes the steps described below.

Audio data to be processed and a variable-speed rate of at least one audio frame in the audio data are acquired.

The at least one audio frame is sequentially used as a current audio frame to be processed, and the current audio frame is converted to a frequency domain.

A target phase signal of the current audio frame is determined according to a variable-speed rate of the current audio frame and a variable-speed rate of a previous audio frame.

According to the target phase signal, time domain conversion is performed on the current audio frame converted to the frequency domain to obtain a processed current audio frame.

The present application provides an audio data processing apparatus. The apparatus includes an information acquisition module, a frequency domain conversion module, an audio processing module and a result acquisition module.

The information acquisition module is configured to acquire audio data to be processed and a variable-speed rate of at least one audio frame in the audio data.

The frequency domain conversion module is configured to sequentially use the at least one audio frame as a current audio frame to be processed and convert the current audio frame to a frequency domain.

The audio processing module is configured to determine a target phase signal of the current audio frame according to a variable-speed rate of the current audio frame and a variable-speed rate of a previous audio frame.

The result acquisition module is configured to perform, according to the target phase signal, time domain conversion on the current audio frame converted to the frequency domain to obtain a processed current audio frame.

The embodiments of the present application provide a computer device. The computer device includes one or more processors and a storage apparatus.

The storage apparatus is configured to store one or more programs.

When executing the one or more programs, one or more processors implement the audio data processing method provided in the embodiments of the present application.

The embodiments of the present application provide a computer-readable storage medium storing a computer program. When the computer program is executed by a processor, the audio data processing method provided in the embodiments of the present application is implemented.

DETAILED DESCRIPTION

Figure 1:
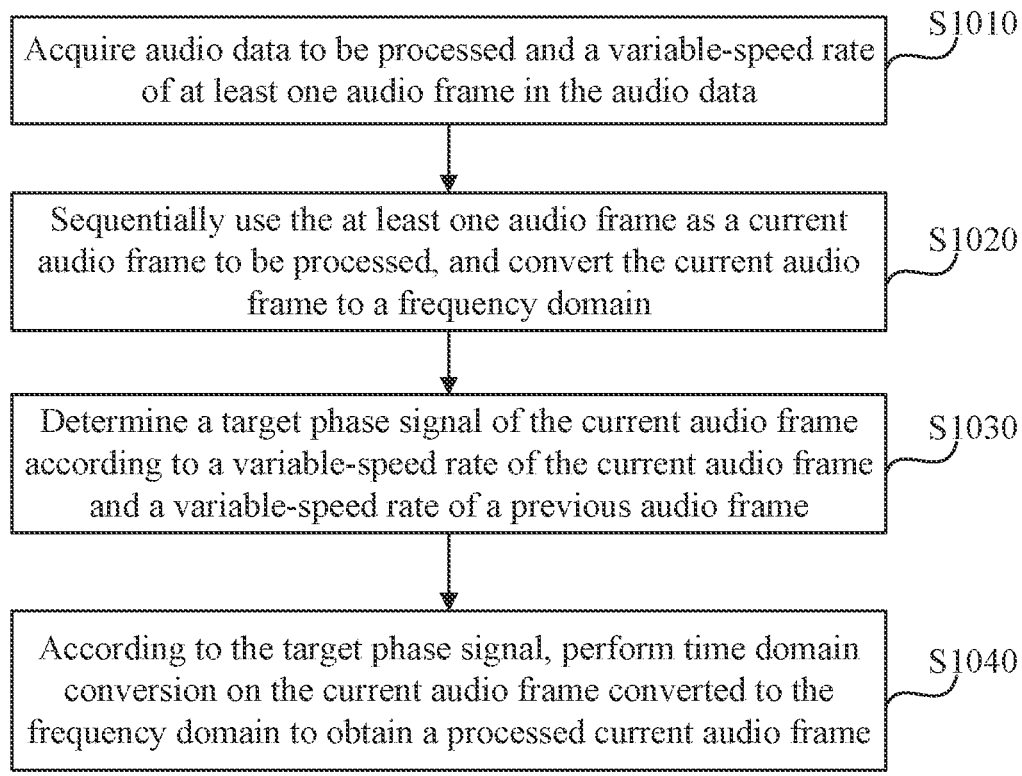
FIG. 1 illustrates a flowchart of an audio data processing method according to embodiment one of the present application.

The present application is described hereinafter in conjunction with drawings and embodiments. The embodiments described herein are merely intended to explain, but not to limit, the present application. For ease of description, only part, not all, of structures or configurations related to the present application are illustrated in the drawings.

Embodiment One

FIG. 1 illustrates a flowchart of an audio data processing method according to embodiment one of the present application. The method is suitable for the situation of variable-speed processing of audio data to be played at variable-speed rates. The method can be performed by an audio data processing apparatus which can be implemented by software and/or hardware and generally integrated on a computer device.

In this embodiment, the computer device may be an intelligent terminal having a recording function or a live broadcast and video segmentation function. In an embodiment, the computer device may be an electronic device such as a mobile phone, a tablet computer and a laptop.

As shown in FIG. 1, an audio data processing method is provided in embodiment one of the present application. The method includes the operations described below.

In S1010, audio data to be processed and a variable-speed rate of at least one audio frame in the audio data are acquired.

In this embodiment, the audio data to be processed may be audio data input by a user that needs to be played at variable-speed rates, and the audio data may be voice data recorded by a user through a computer device or may be selected audio file data. Before inputting the audio data to be processed, the user may mark the variable-speed rate of a variable-speed segment of the audio data and may set different variable-speed rates for the audio data of different variable-speed segments.

Through this step, the audio data to be processed after the user marks the variable-speed rate can be obtained. Meanwhile, the audio data is processed in units of frames in this embodiment, thereby acquiring the variable-speed rate corresponding to at least one audio frame in the audio data according to the variable-speed rate marked by the user. In an embodiment, the acquired audio data may be framed in an overlapping framing manner, and an audio frame formed in such framing manner includes part of the audio signals in an adjacent audio frame. In an embodiment, if an audio frame includes audio signals with two variable-speed rates, the first variable-speed rate may be used as the variable-speed rate of the audio frame in this embodiment.

According to the audio data processing method provided in this embodiment, after the audio data to be processed is acquired, the method further includes: performing overlapping framing of a second frame length on the audio data by using a first frame length as a frame shift so as to obtain the at least one audio frame; and recording a first audio signal of a first frame length in each audio frame among the at least one audio frame as a time domain frame corresponding to the each audio frame, and caching at least one time domain frame corresponding to the at least one audio frame to a set cache area.

In this embodiment, after the operation of acquiring the audio data to be processed is performed, the audio data is framed by using overlapping framing. In an embodiment, the first frame length is set as the frame shift of the overlapping framing, and the second frame length is used as the frame length of the overlapping framing, thereby acquiring at least one audio frame. Exemplarily, assuming that the first frame length is 240 audio signal points and the second frame length is 2048 audio signal points, it is equivalent to forming an audio frame having a length of 2048 by moving every 240 audio signal points from the first audio signal point of the audio data.

Each audio frame formed by overlapping framing is equivalent to including a plurality of audio signals of a first frame length. In this embodiment, the first audio signal of the first frame length included in each audio frame may be determined as the time domain frame corresponding to the each audio frame, and at least one time domain frame is cached to the set cache area. Thereby, the audio data is cached to the set cache area in the form of time domain frames without overlapping.

Figure 2:
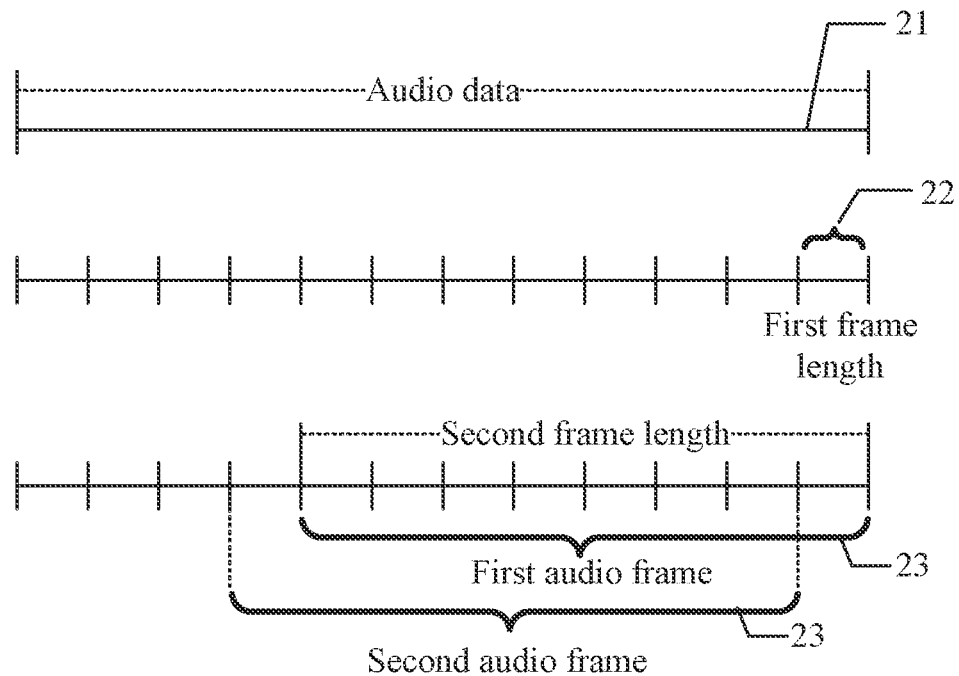
FIG. 2 illustrates a schematic diagram of overlapping framing of audio data according to embodiment one of the present application.

Exemplarily, FIG. 2 illustrates a schematic diagram of overlapping framing of audio data according to embodiment one of the present application. As shown in FIG. 2, after audio data 21 to be processed is acquired, the audio data may first be framed with a first frame length, the first frame length is then used as a frame shift 22, and at least one audio frame 23 of a second frame length is obtained. In this example, overlapping audio signals exist in adjacent audio frames, and the first audio signals of the first frame length in the plurality of audio frames 23 can form the complete audio data. In this embodiment, the first audio signal of the first frame length in each audio frame is marked as the time domain frame corresponding to each audio frame.

In S1020, the at least one audio frame is sequentially used as a current audio frame to be processed, and the current audio frame is converted to a frequency domain.

The variable-speed processing of the audio data in this embodiment may be the variable-speed processing of at least one audio frame of the audio data. In this embodiment, the audio frame to be subjected to the variable-speed processing at present is recorded as the current audio frame, and the adjacent audio frame subjected to the variable-speed processing before the current audio frame is recorded as the previous audio frame. In addition, in this embodiment, phase domain (that is, frequency domain) variable-speed processing is used for the audio data. Therefore, in this step, Fourier transform is first performed on the current audio frame to obtain the current audio frame converted to the frequency domain, and the current audio frame in the frequency domain can be represented by an amplitude signal and a phase signal.

In S1030, a target phase signal of the current audio frame is determined according to a variable-speed rate of the current audio frame and a variable-speed rate of a previous audio frame.

In this embodiment, the target phase signal may be understood as a phase signal obtained after the current audio frame is subjected to variable-speed processing to achieve phase signal adjustment when the current audio frame is played at a corresponding variable-speed rate. The target phase signal can be determined in this step in different manners according to whether the variable-speed rate of the current audio frame is the same as or different from the variable-speed rate of the previous audio frame.

Exemplarily, in this step, the phase shift amount obtained due to the fact that the variable-speed rate of the current audio frame affects the phase signal of the current audio frame is firstly determined according to the variable-speed rate of the current audio frame and the variable-speed rate of the previous audio frame. Therefore, the original phase signal representing the current audio frame is adjusted by the phase shift amount. When the variable-speed rate of the current audio frame is the same as the variable-speed rate of the previous audio frame, the phase signal after the original phase signal of the current audio frame is adjusted based on the phase shift amount can be directly used to represent the target phase signal of the current audio frame after the variable-speed. When the variable-speed rate of the current audio frame is different from the variable-speed rate of the previous audio frame, it is necessary to first determine a compensation phase signal by using the phase signal after the original phase signal of the current audio frame is adjusted based on the phase shift amount and the variable-speed rate of the current audio frame, and finally the target phase signal is determined through the compensation phase signal and the phase signal after the original phase signal of the current audio frame is adjusted based on the phase shift amount.

In S1040, according to the target phase signal, time domain conversion is performed on the current audio frame converted to the frequency domain to obtain a processed current audio frame.

In this embodiment, after the target phase signal is determined based on the variable-speed rate of an audio frame, the target phase signal can be combined with the original amplitude signal of the current audio frame so that the processed current audio frame in the time domain is obtained through inverse Fourier transform. In this embodiment, after the processing of the current audio frame is completed, the process may return to S1020 to use the next audio frame as a new current audio frame, and then the operations of S1020 to S1040 are performed again to achieve variable-speed processing of the next audio frame. The operations of S1020 to S1040 may be performed cyclically until the variable-speed processing of the last audio frame of audio data is completed.

According to the embodiment of the present application, the audio data to be processed and the variable-speed rate of at least one audio frame in the audio data are first acquired; then the at least one audio frame is sequentially selected as the current audio frame to be processed, and the current audio frame is converted to the frequency domain; then the target phase signal of the current audio frame is determined according to the variable-speed rate of the current audio frame and the variable-speed rate of the previous audio frame; finally, according to the target phase signal, the time domain conversion is performed on the current audio frame converted to the frequency domain to obtain the processed current audio frame. With this method, the variable-speed processing of audio data having different variable-speed rates in the phase domain is achieved, not only ensuring the consistency of the audio data after the variable-speed with the original audio data in tone and timbre, but also avoiding the problem that phase and amplitude hopping appears between adjacent audio frames in the audio data having different variable-speed rates, and thereby ensuring the integrity of the sound quality and ensuring the playing effect of the processed audio data.

Embodiment Two

Figure 3:
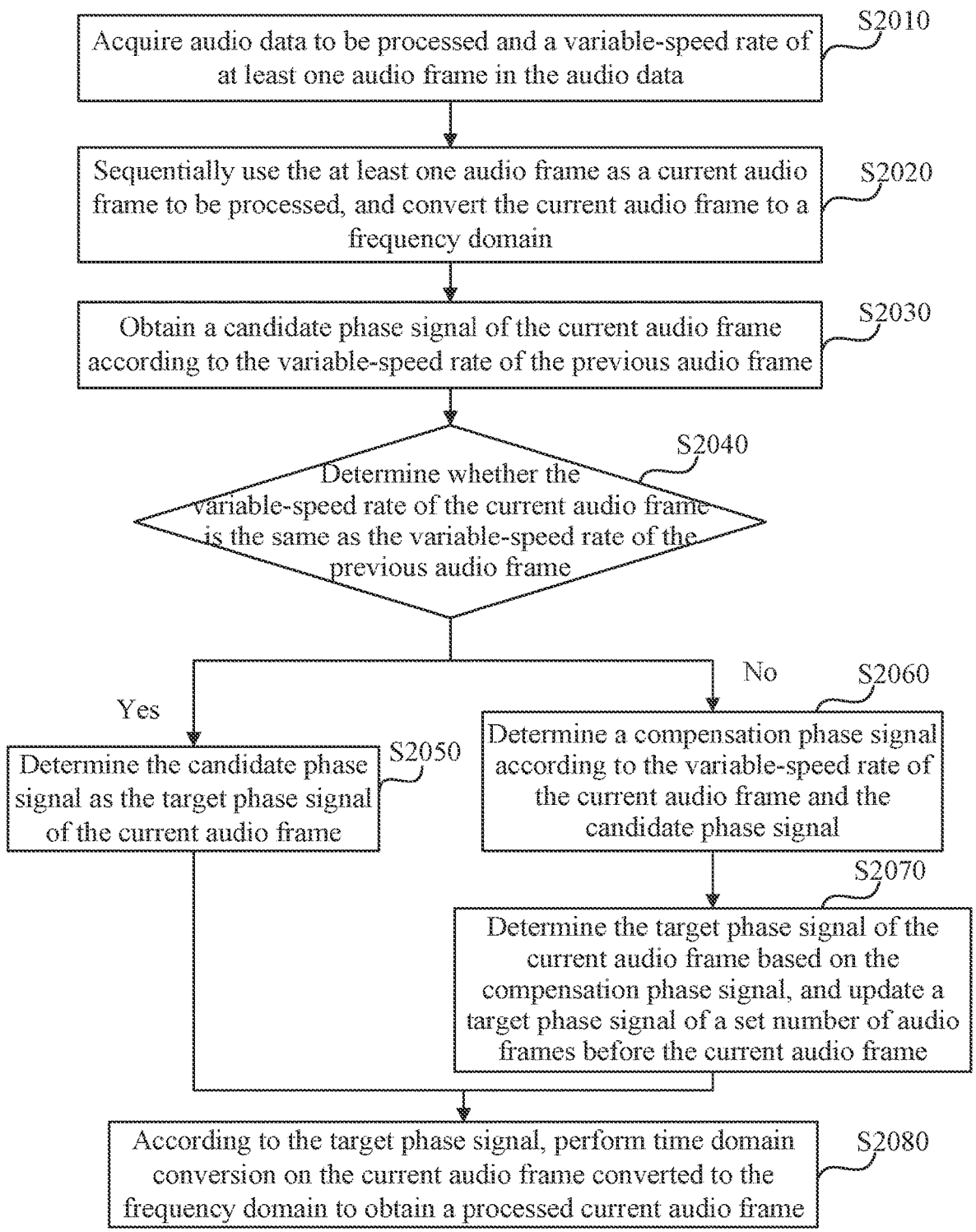
FIG. 3 illustrates a flowchart of an audio data processing method according to embodiment two of the present application.

FIG. 3 illustrates a flowchart of an audio data processing method according to embodiment two of the present application. This embodiment of the present application is illustrated on the basis of the preceding embodiment. In this embodiment, the step of determining the target phase signal of the current audio frame according to the variable-speed rate of the current audio frame and the variable-speed rate of the previous audio frame includes: obtaining a candidate phase signal of the current audio frame according to the variable-speed rate of the previous audio frame; in a case where the variable-speed rate of the current audio frame is the same as the variable-speed rate of the previous audio frame, determining the candidate phase signal as the target phase signal of the current audio frame; and in a case where the variable-speed rate of the current audio frame is different from the variable-speed rate of the previous audio frame, determining a compensation phase signal according to the variable-speed rate of the current audio frame and the candidate phase signal, determining the target phase signal of the current audio frame based on the compensation phase signal, and updating a target phase signal of a set number of audio frames before the current audio frame.

As shown in FIG. 3, an audio data processing method is provided in embodiment two of the present application. The method includes the operations described below.

In S2010, audio data to be processed and a variable-speed rate of at least one audio frame in the audio data are acquired.

In S2020, the at least one audio frame is sequentially used as a current audio frame to be processed, and the current audio frame is converted to a frequency domain.

S2010 and S2020 in this embodiment have been explained correspondingly in embodiment one, and repetition is not made here.

In S2030, a candidate phase signal of the current audio frame is obtained according to the variable-speed rate of the previous audio frame.

When phase domain variable-speed processing is performed on audio data to be played at variable-speed rates, the influence of a variable-speed rate on the original phase signal of the audio data in frequency domain is mainly considered. For audio data with different variable-speed rates, when the current audio frame is subjected to variable-speed processing, the original phase signal of the current audio frame can be first adjusted according to the variable-speed rate of the previous audio frame, and the phase signal obtained after adjustment is determined as the candidate phase signal of the current audio frame. In an embodiment, the phase shift amount required for adjustment can be first determined according to the variable-speed rate of the previous audio frame and the phase shift amount calculation formula, and then the original phase signal of the current audio frame is adjusted based on the phase shift amount, thereby obtaining the adjusted candidate phase signal of the current audio frame.

In S2040, it is determined whether the variable-speed rate of the current audio frame is the same as the variable-speed rate of the previous audio frame, and if the variable-speed rate of the current audio frame is the same as the variable-speed rate of the previous audio frame, S2050 is performed;

if the variable-speed rate of the current audio frame is different from the variable-speed rate of the previous audio frame, S2060 is performed.

Generally, the candidate phase signal having been determined is equivalent to achieving the variable-speed processing in the phase domain when the variable-speed rate is constant. This embodiment mainly solves the problem of poor variable-speed processing effect when the variable-speed rate is changed. Therefore, after the candidate phase signal is determined, it is determined in this embodiment whether the variable-speed rate of the current audio frame has changed from the variable-speed rate of the previous audio frame based on this step, and subsequent processing is performed according to the determination result.

In S2050, the candidate phase signal is determined as the target phase signal of the current audio frame.

In an embodiment, when it is determined that the variable-speed rate of the current audio frame is the same as the variable-speed rate of the previous audio frame through the determination in S2040, the determined candidate phase signal can be directly used as the target phase signal of the current audio frame. The target phase signal can be regarded as the phase signal obtained after the original phase signal of the current audio frame is subjected to the phase domain variable-speed processing.

In S2060, a compensation phase signal is determined according to the variable-speed rate of the current audio frame and the candidate phase signal.

In this embodiment, if the variable-speed rate of the current audio frame is different from the variable-speed rate of the previous audio frame, it can be considered that the determined candidate phase signal cannot be directly used as the processed target phase signal, and a compensation phase signal is also required to be determined based on the variable-speed rate of the current audio frame and the determined candidate phase signal, so as to achieve the adjustment of the original phase signal of the current audio frame through the compensation phase signal and the candidate phase signal.

Theoretically, in order to obtain the target phase signal corresponding to the variable-speed rate of the current audio frame, the target phase signal of the current audio frame can be determined directly based on the variable-speed rate of the current audio frame combined with relevant information of the previous audio frame such as the original phase signal of the previous audio frame and the processed target phase signal of the previous audio frame. In practice, however, in order to ensure the accuracy of different target phase signals of an audio frame obtained when the speed variation rates are different, the candidate phase signals of a set number of audio frames before the current audio frame are re-determined by using the variable-speed rate of the current audio frame in this embodiment. Then, a compensation phase signal is obtained based on the candidate phase signal re-determined in the previous step. Finally, the target phase signal of the current audio frame is determined through the obtained compensation phase signal.

After audio data is initially acquired, the operation of caching the time domain frame corresponding to the audio frame to the set cache area is also performed when at least one audio frame is obtained after overlapping framing is performed on audio data. The purpose of such operation is to cache the original audio data before the audio data is processed so that the original audio data is used when required in the audio data processing.

After the set cache area is set to cache the time domain frame of the audio frame, it is considered in this embodiment using the original audio data cached in the set cache area to determine the compensation phase signal. In an embodiment, the step of determining the compensation phase signal according to the variable-speed rate of the current audio frame and the candidate phase signal includes: acquiring, from the set cache area, a current time domain frame corresponding to the current audio frame and a set number of historical time domain frames before the current time domain frame; sequentially determining, based on the variable-speed rate of the current audio frame, new candidate phase signals of audio frames corresponding to the set number of historical time domain frames and a new candidate phase signal of the audio frame corresponding to the current time domain frame; and determining a difference between the new candidate phase signal corresponding to the current audio frame and the candidate phase signal as the compensation phase signal.

For the preceding steps, in this embodiment, the current time domain frame corresponding to the current audio frame is first obtained from the set cache area, and a set number of historical time domain frames before the current time domain frame are simultaneously obtained. In an embodiment, the set number of frames should be set to satisfy that the length of all the obtained time domain frames is at least equal to the frame length of one audio frame. Exemplarily, assuming that the frame length of the audio frame is 2048 and the frame length of one time domain frame is 240, 2048÷240=8.53. In this case, the set number of frames may be set to 9 in order to ensure that the length of the selected time domain frames is at least equal to the frame length of the audio frame. In this embodiment, after the current time domain frame and a set number of historical time domain frames are acquired, the new candidate phase signals of the audio frames corresponding to a set number of historical time domain frames and the current time domain frame are sequentially determined from front to back, from the first historical time domain frame.

Exemplarily, the determination operation of a new candidate phase signal may be as described below. Assuming that the current time domain frame is the i-th frame and the set number of frames is 9, an audio frame of a second frame length is formed starting from the (i−9)-th time domain frame. The (i−9)-th time domain frame is the first one that is of the first frame length in the audio frame and the audio frame may be recorded as an (i−9)-th audio frame. For the (i−9)-th audio frame, the step of S2030 may be adopted. The current audio frame in S2030 is regarded as the (i−9)-th audio frame. The variable-speed rate of the previous audio frame is replaced with the variable-speed rate of the audio frame corresponding to the i-th time domain frame (the current time domain frame) to determine the new candidate phase signal of the (i−9)-th audio frame. When the new candidate phase signal of the (i−9)-th audio frame is determined, other required relevant information of the previous audio frame is actually the relevant information of the (i−10)-th audio frame. Then, in the same manner as determining the candidate phase signal of the (i−9)-th audio frame, the new candidate phase signal of the (i−8)-th audio frame is determined (the previous audio frame is the (i−9)-th audio frame, the new candidate phase signal of the (i−9)-th audio frame may be used as the required target phase signal of the previous audio frame, and the variable-speed rate of the audio frame corresponding to the i-th time domain frame may be used as the required variable-speed rate of the previous audio frame in the execution process). Iteration backward is performed in sequence until the new candidate phase signal of the i-th audio frame (equivalent to the audio frame corresponding to the current time domain frame) is determined.

After the new candidate phase signal of the current audio frame corresponding to the current time domain frame is determined based on the preceding operation, the difference between the new candidate phase signal and the previously determined candidate phase signal may be determined as the compensation phase signal.

In S2070, the target phase signal of the current audio frame is determined based on the compensation phase signal, and a target phase signal of a set number of audio frames before the current audio frame is updated.

In this embodiment, after the new candidate phase signal of the current audio frame is determined, the compensation phase signal can be determined, and the new candidate phase signal is adjusted (for example, two signals are added) based on the compensation phase signal to obtain the target phase signal of the current audio frame.

When a new candidate phase signal of a current audio frame is determined, the candidate phase signals of a set number of audio frames before the current audio frame are also recalculated. Therefore, the target phase signals of a set number of audio frames can be updated based on the compensation phase signal and the new candidate phase signals of a set number of audio frames before the current audio frame to obtain the new target phase signals of the set number of audio frames.

In an embodiment, the step of determining the target phase signal of the current audio frame based on the compensation phase signal, and updating the target phase signal of the set number of audio frames before the current audio frame includes: determining a sum of the new candidate phase signal of the current audio frame and the compensation phase signal as the target phase signal of the current audio frame; and determining sums of the new candidate phase signals of the audio frames corresponding to the set number of historical time domain frames and the compensation phase signal as new target phase signals of the set number of audio frames before the current audio frame, respectively.

In this embodiment, the sum of the compensation phase signal and the new candidate phase signal of the current audio frame can be calculated, and the calculated sum of the compensation phase signal and the new candidate phase signal of the current audio frame is used as the target phase signal of the current audio frame. In addition, a set number of audio frames before the current audio frame are actually equivalent to the audio frames corresponding to a set number of historical time domain frames. It is also possible to obtain the new candidate phase signals of the set number of audio frames. Then, the sums of the new candidate phase signals of the set number of audio frames and the compensation phase signal are determined as the new target phase signals of the corresponding audio frames, so as to achieve the update of the target phase signals of the set number of audio frames.

In S2080, according to the target phase signal, time domain conversion is performed on the current audio frame converted to the frequency domain to obtain a processed current audio frame. In summary, the embodiment of the present application describes the process of performing variable-speed processing on the current audio frame in the phase domain to obtain the target phase signal when the variable-speed rate changes. In this embodiment, the influence on a target phase signal formed through the variable-speed processing when the variable-speed rates of different audio frames in the audio data change is considered in the processing process, ensuring the consistency of the audio data after variable-speed with the original audio data in tone and timbre, avoiding the problem that phase and amplitude hopping appears between adjacent audio frames in the audio data having different variable-speed rates, and thereby ensuring the integrity of the sound quality of the processed audio data and improving the use experience of a user.

On the basis of the preceding step, an audio data processing method is further provided in embodiment two and describes the preceding step S2030. The method includes: determining a phase shift amount of the current audio frame according to the variable-speed rate of the previous audio frame, an original phase signal of the previous audio frame and a target phase signal of the previous audio frame; and determining the candidate phase signal of the current audio frame according to the phase shift amount and an original phase signal of the current audio frame.

In this embodiment, the phase shift amount required for adjusting an original phase signal can be determined by a phase shift amount calculation formula. When the phase shift amount is calculated based on the phase shift amount calculation formula, the required known information includes the variable-speed rate of the previous audio frame, the original phase signal when the previous audio frame is converted to the frequency domain, and the target phase signal obtained after the variable-speed processing of the previous audio frame and the original phase signal of the current audio frame.

In an embodiment, the step of determining the phase shift amount of the current audio frame according to the variable-speed rate of the previous audio frame, the original phase signal of the previous audio frame and the target phase signal of the previous audio frame includes: determining a phase difference between the current audio frame and the previous audio frame according to a phase difference calculation formula $\Delta_i=\zeta+[\varphi_i-\varphi_{i-1}-\zeta]_{2\pi}$, the original phase signal of the current audio frame and the original phase signal of the previous audio frame; and determining the phase shift amount of the current audio frame according to a phase shift amount calculation formula $\theta_i=[\psi_{i-1}+r_{i-1}\Delta_i-\varphi_i]_{2\pi}$, the target phase signal of the previous audio frame, the variable-speed rate of the previous audio frame, the original phase signal of the current audio frame and the phase difference between the current audio frame and the previous audio frame. $\theta_i$ denotes a phase shift amount of an i-th audio frame, $\Delta_i$ denotes a phase difference between the i-th audio frame and an (i−1)-th audio frame, $\varphi_i$ denotes an original phase signal of the i-th audio frame, $\varphi_{i-1}$ denotes an original phase signal of the (i−1)-th audio frame, $\zeta$ denotes a set phase compensation constant, $\psi_{i-1}$ denotes a target phase signal of the (i−1)-th audio frame, $r_{i-1}$ denotes a variable-speed rate of the (i−1)-th audio frame, and $[.]_{2\pi}$ denotes a modulo of $2\pi$.

In an embodiment, when the phase shift amount of the current audio frame is calculated, the phase difference between the current audio frame and the previous audio frame is first required to be calculated according to the phase difference calculation formula. In calculation of the phase difference, the required known quantities are the original phase signal of the current audio frame, the original phase signal of the previous audio frame and a phase compensation constant set based on experience. After the phase difference is determined, the phase shift amount of the current audio frame can be determined according to the phase shift amount calculation formula. In calculation of the phase shift amount, the required known quantities are the target phase signal obtained after the processing of the previous audio frame, the variable-speed rate of the previous audio frame, the original phase signal of the current audio frame and the previously determined phase difference.

Adjusting the phase signal of at least one audio frame in audio data is equivalent to an iterative processing process, which requires the variable-speed rate of the previous audio frame and the determined phase signal information; then, the sum of the original phase signal of the current audio frame and the determined phase shift amount may be used as the adjusted candidate phase signal.

In an embodiment, the step of determining the candidate phase signal of the current audio frame according to the phase shift amount and the original phase signal of the current audio frame includes: 1) acquiring an amplitude signal of the current audio frame, and determining a plurality of amplitude labels corresponding to a plurality of peak points in the amplitude signal; 2) determining a peak phase shift amount of the current audio frame according to the phase shift amount of the current audio frame and an amplitude label corresponding to each peak point; and 3) determining a sum of the original phase signal of the current audio frame and the peak phase shift amount as the candidate phase signal of the current audio frame.

The preceding steps of this embodiment achieve the determination process of the candidate phase signal of the current audio frame. The candidate phase signal is required to be determined by using the phase shift amount obtained above in this embodiment. In an embodiment, to ensure the playing sound quality of the audio frame after variable-speed, adjusting the phase shift amount is first considered, and the manner of adjusting the phase shift amount is provided in the preceding steps 1) and 2).

For the preceding step 1), in this embodiment, the amplitude signal may be obtained directly after the current audio frame is converted to the frequency domain. The obtained amplitude signal is actually equivalent to a vector whose length is half the frame length of the current audio frame. In this embodiment, a plurality of peak points in the amplitude signal can be extracted in a manner of traversing a plurality of amplitude values of the amplitude signal, and the amplitude label corresponding to each peak point can be determined.

For the preceding step 2), in this embodiment, it is assumed that k is used to denote the amplitude label of an amplitude value in the amplitude signal corresponding to the current audio frame, k∈[1, m], and m is half the frame length of the audio frame; Pj is used to denote the amplitude label of a peak point in the amplitude signal, j∈[1,m) the amplitude label of at least one peak point in the amplitude signal can be traversed from k=1, and the amplitude label $J_j(k)$ of the peak point closest to k can be determined by a formula $J_j(k)=\arg\min_{P_j}|k-P_j|$. In addition, the phase shift amount is actually equivalent to a phase shift vector having the same length as the phase signal. The phase shift amount also corresponds to the amplitude signal of the audio frame, which is equivalent to that an amplitude label in the amplitude signal corresponds to a vector value in the phase shift amount. Exemplarily, $\theta_a$ denotes the vector value corresponding to the amplitude label $J_j(k)$ a in the phase shift amount; therefore, for the amplitude label k, after the amplitude label $J_j(k)$ closest to the peak point is determined, the vector value $\theta_{J_j(k)}$ corresponding to $J_j(k)$ can be used to replace the vector value $\theta_k$ currently corresponding to k, thereby forming the peak phase shift amount of the current audio frame.

For the preceding step 3), to better protect the sound quality after the variable-speed, the embodiment adopts the peak point in the amplitude signal of the audio frame to adjust the phase shift amount and then determines the sum of the optimized phase shift amount and the original phase signal as the adjusted candidate phase signal. Therefore, the integrity of the sound quality of the processed audio data and the audio data processing effect when the audio data has different variable-speed rates are better ensured.

Embodiment Three

Figure 4:
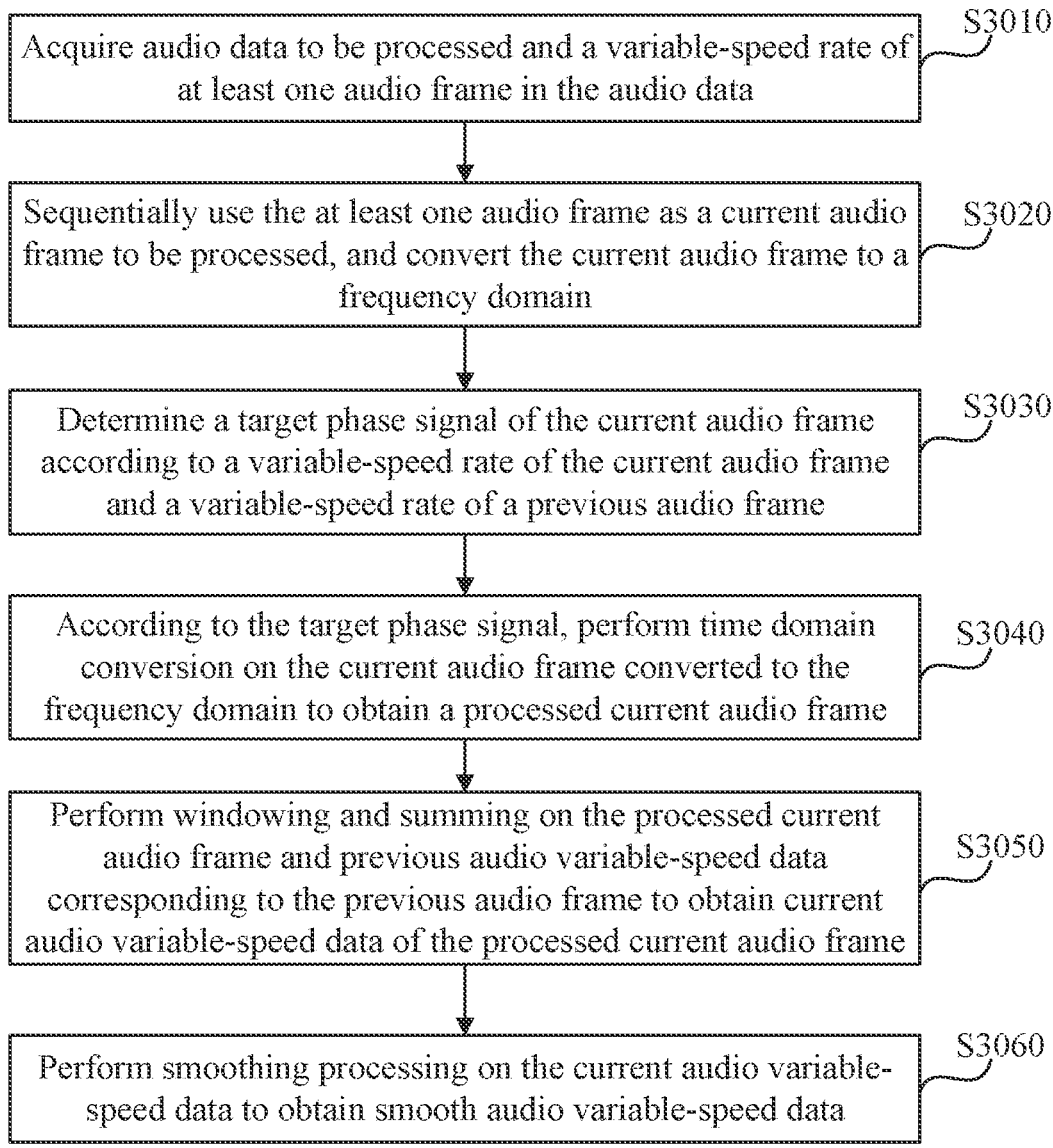
FIG. 4 illustrates a flowchart of an audio data processing method according to embodiment three of the present application.

FIG. 4 illustrates a flowchart of an audio data processing method according to embodiment three of the present application. Embodiment three of the present application is described on the basis of the preceding embodiments. The preceding embodiments of the present application achieve the determination of the target phase signal of at least one audio frame of the audio data, and time domain conversion is performed based on the target phase signal to finally obtain the processed audio frame. On this basis, a step of forming audio variable-speed data based on the processed audio frame is also added in embodiment three of the present application. The added step is performing windowing and summing on the processed current audio frame and previous audio variable-speed data corresponding to the previous audio frame to obtain current audio variable-speed data of the processed current audio frame.

Meanwhile, a step of performing smooth processing on the current audio variable-speed data to obtain smooth audio variable-speed data is also added in this embodiment.

As shown in FIG. 4, an audio data processing method is provided in embodiment three of the present application. The method includes the operations described below.

In S3010, audio data to be processed and a variable-speed rate of at least one audio frame in the audio data are acquired.

In S3020, the at least one audio frame is sequentially used as a current audio frame to be processed, and the current audio frame is converted to a frequency domain.

In S3030, a target phase signal of the current audio frame is determined according to a variable-speed rate of the current audio frame and a variable-speed rate of a previous audio frame.

In S3040, according to the target phase signal, time domain conversion is performed on the current audio frame converted to the frequency domain to obtain a processed current audio frame.

The implementation of S3010 to S3040 in this embodiment has been described in embodiment one and embodiment two. Repetition is not made here.

In S3050, windowing and summing is performed on the processed current audio frame and previous audio variable-speed data corresponding to the previous audio frame to obtain current audio variable-speed data of the processed current audio frame.

In an embodiment, this step may be performed each time after a processed audio frame is acquired. That is, the windowing and summing may be performed on the processed current audio frame and the previous audio variable-speed data corresponding to the previous audio frame to obtain the corresponding current audio variable-speed data. If the current audio frame is the last audio frame, the formed current audio variable-speed data may be used as audio playing data to be played subsequently.

Exemplarily, the acquisition of audio variable-speed data may be described as follows: for the first audio frame, the corresponding audio variable-speed data is the first audio frame after processing of the first audio frame itself, for the second audio frame, the processed second audio frame and the previous audio variable-speed data (the processed first audio frame) may be subjected to windowing and summing to obtain the audio variable-speed data corresponding to the second audio frame; and then for the third audio frame and the following audio frames, the corresponding audio variable-speed data can be obtained iteratively in the above manner until the last audio frame. Therefore, the current audio variable-speed data is obtained through the windowing and summing on the processed current audio frame and the previous audio variable-speed data obtained iteratively.

For the current audio frame, before the current audio frame is processed, the previous audio frame has been subjected to variable-speed processing, that is, the corresponding processed audio frame has been obtained. It is assumed that the variable-speed rate is different from the previous variable-speed rate in the current audio frame processing process. The target phase signals of a set number of audio frames before the current audio frame are required to be updated, which is also equivalent to re-determining the processed audio frames of a set number of audio frames according to the new target phase signals. In addition, when the audio frames are subjected to windowing and summing subsequently, the newly processed audio frames are required to be used to form new corresponding audio variable-speed data.

In this step, the process of performing windowing summation on the audio frames is equivalent to the process of combining the audio frames to form a piece of audio data. Since overlapping framing is initially used, currently using windowing and summing is equivalent to combining a plurality of audio frames with a set frame shift, thereby ensuring that no duplicate audio signal exists in the formed audio data. The set frame shift may be set according to the frame shift at the time of framing and is generally set as the product of the frame shift at the time of framing and the variable-speed rate of the current audio frame. In S3060, smoothing processing is performed on the current audio variable-speed data to obtain smooth audio variable-speed data.

In this embodiment, when the candidate phase signal is determined, the adjusted peak phase shift amount is adopted and thus may cause the phase relationship between two adjacent frames when audio frames are combined to become more complicated. In addition, when the variable-speed rate of the current audio frame is different from the variable-speed rate of the previous audio frame, the corresponding two audio frames when a change in variable-speed rate occurs will still have a slight overlapping problem after phase compensation is performed based on the determined compensation phase signal. Therefore, this embodiment adopts this step to perform smoothing processing on the obtained current audio variable-speed data. In this embodiment, a quartic function is adopted for performing smoothing processing on a signal segment to be smoothed, so as to avoid the overlapping problem after windowing and summing is performed on audio frames corresponding to different variable-speed rates.

In an embodiment of the present application, the step of performing the smoothing processing on the current audio variable-speed data to obtain the smooth audio variable-speed data includes: determining a starting position and an ending position of a signal segment to be smoothed in the current audio variable-speed data; determining, according to a set quartic function calculation formula, a target signal strength value and a first derivative of the starting position and a target signal strength value and a first derivative of the ending position; and forming a smooth curve based on the target signal strength value and the first derivative of the starting position and the target signal strength value and the first derivative of the ending position, and using the smooth curve to replace the signal segment to be smoothed to obtain the smooth audio variable-speed data of the current audio variable-speed data.

In this embodiment, the current audio variable-speed data may be equivalent to the combination of the processed current audio frame and the previous audio variable-speed data corresponding to the processed previous audio frame. Therefore, the combined part of the current audio frame and the previous audio variable-speed data is prone to an overlapping problem. Thus, this embodiment considers determining the signal segment to be smoothed in the combined part of the current audio frame and the previous audio variable-speed data. The last two signal points in the processed previous audio frame may be used as the starting position of the signal segment to be smoothed. Then, one of the first maximum value point or the first minimum value point is selected from the processed current audio frame as the ending position of the signal segment to be smoothed. The selection principle of the first maximum value point or the first minimum value point may be to ensure that the gradient change rate of the obtained smooth curve is lower.

After the starting position and the ending position of the signal segment to be smoothed is determined, the target signal strength value and the corresponding first derivative of the starting position and the target signal strength value and the corresponding first derivative of the ending position can be determined according to the set quartic function calculation formula. Then, a smooth curve can be determined based on the determined target signal strength values and the first derivatives. In this embodiment, the smooth curve is considered to be used to replace the signal segment to be smoothed, so as to obtain smooth audio variable-speed data of the current audio variable-speed data.

In summary, the preceding embodiments of the present application achieve that the processed time domain audio frames form playable audio variable-speed data after variable-speed and achieve smoothing processing of the audio variable-speed data, better solving the problem that phase and amplitude hopping exists between adjacent audio frames in the audio data variable-speed processing, ensuring the consistency of the processed audio data with the original audio data in tone and timbre, ensuring the integrity of the sound quality and thereby ensuring the playing effect of the processed audio data.

Figure 5:
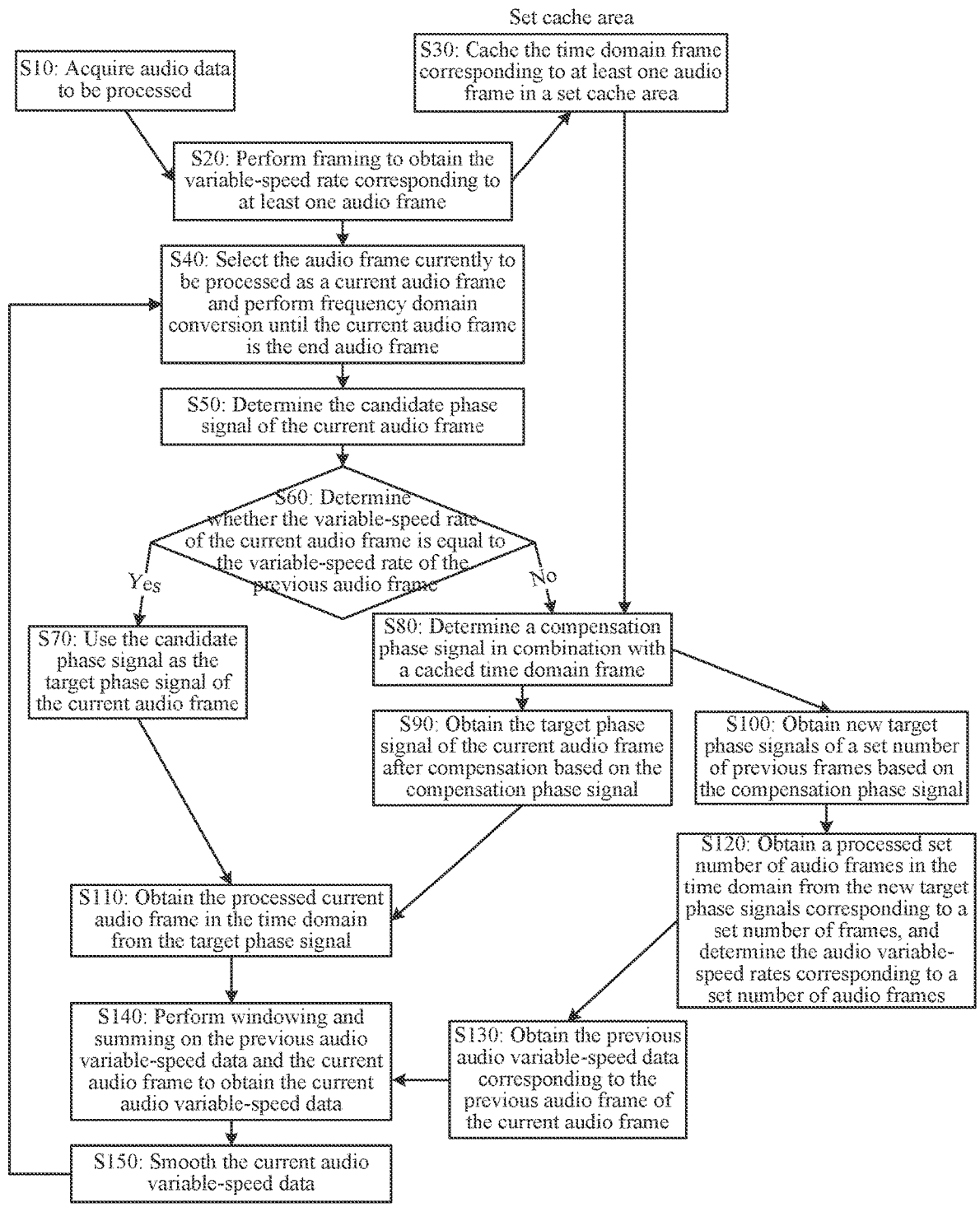
FIG. 5 illustrates a schematic diagram of implementing audio data processing according to embodiment three of the present application.

Exemplarily, in combination with embodiment one and embodiment two, this embodiment further provides a comprehensive description of audio data variable-speed processing. FIG. 5 illustrates a schematic diagram of implementing audio data processing according to an embodiment of the present application. As shown in FIG. 5, the process of implementing audio variable-speed processing of audio data to be processed is described as a whole. The process includes the steps described below. In S10, audio data to be processed is acquired. In S20, overlapping framing is performed to obtain the variable-speed rate corresponding to at least one audio frame. In S30, the time domain frame corresponding to at least one audio frame is cached in a set cache area. In S40, the audio frame currently to be processed is selected as a current audio frame, frequency domain conversion is performed, and the following operations are performed until the current audio frame is the end audio frame. In S50, the candidate phase signal of the current audio frame is determined. In S60, a variable-speed rate is determined; S70 is performed if the variable-speed rate of the previous audio frame is the same as the variable-speed rate of the current audio frame, and S80 is performed if the variable-speed rate of the previous audio frame is different from the variable-speed rate of the current audio frame. In S70, the candidate phase signal is used as the target phase signal of the current audio frame. In S80, a compensation phase signal is determined in combination with a time domain frame cached in step S20. In S90, the target phase signal of the current audio frame after compensation based on the compensation phase signal is obtained. Meanwhile, in S100, new target phase signals of a set number of previous frames are obtained based on the compensation phase signal. S70 and S90 are followed by S110 in which the processed current audio frame in the time domain is obtained from the target phase signal. Step S100 is followed by step S120 in which a processed set number of audio frames in the time domain are obtained from the new target phase signals corresponding to a set number of frames, and the audio variable-speed rates corresponding to a set number of audio frames are determined. Step S120 is followed by step S130 in which the previous audio variable-speed data corresponding to the previous audio frame of the current audio frame is obtained. Step S110 is combined with step S130 as execution information of step S140. In S140, windowing and summing is performed on the previous audio variable-speed data and the current audio frame to obtain the current audio variable-speed data. Finally, through step S150, the current audio variable-speed data is smoothed to obtain the smoothed current audio variable-speed data. After step S150 is performed, the process may return to step S40 for repeated execution until the selected current audio frame is the end audio frame.

In an embodiment, S100 or S120 may not be performed after S80, that is, the new target phase signals of a set number of frames before the current audio frame are not updated, and the corresponding previous audio variable-speed data is obtained in S130 according to the previous audio frame of the current audio frame that is not updated.

For simple description, the method embodiments are all expressed as a series of action combinations. However, those skilled in the art should understand that the embodiments of the present application are not limited by the described action sequences, and according to the embodiments of the present application, some steps may be performed in other sequences or concurrently.

Embodiment Four

Figure 6:
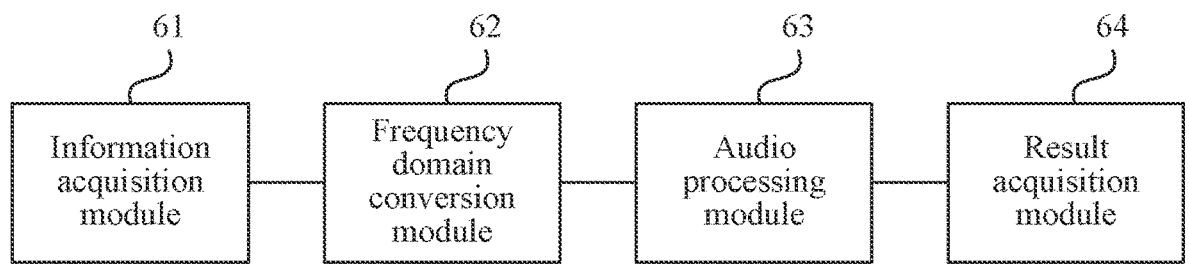
FIG. 6 illustrates a block diagram of a structure of an audio data processing apparatus according to embodiment four of the present application.

FIG. 6 illustrates a block diagram of a structure of an audio data processing apparatus according to embodiment four of the present application. The processing apparatus is suitable for the situation of variable-speed processing of audio data to be played at variable-speed rates. The apparatus can be implemented by software and/or hardware and is generally integrated on a computer device. As shown in FIG. 6, the apparatus includes an information acquisition module 61, a frequency domain conversion module 62, an audio processing module 63 and a result acquisition module 64.

The information acquisition module 61 is configured to acquire audio data to be processed and a variable-speed rate of at least one audio frame in the audio data.

The frequency domain conversion module 62 is configured to sequentially use the at least one audio frame as a current audio frame to be processed and convert the current audio frame to a frequency domain.

The audio processing module 63 is configured to determine a target phase signal of the current audio frame according to a variable-speed rate of the current audio frame and a variable-speed rate of a previous audio frame.

The result acquisition module 64 is configured to perform, according to the target phase signal, time domain conversion on the current audio frame converted to the frequency domain to obtain a processed current audio frame.

Figure 7:
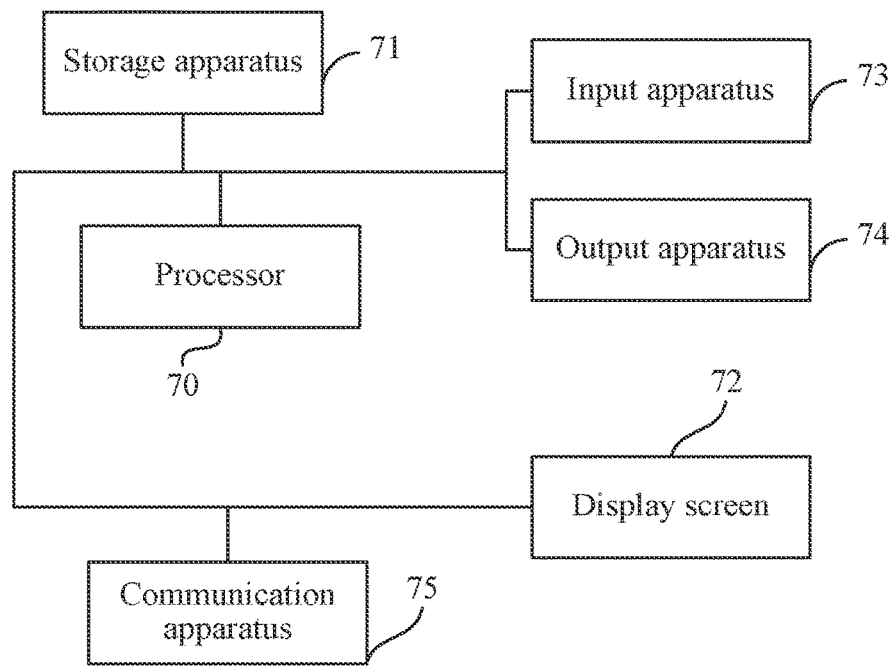
FIG. 7 illustrates a schematic diagram of a hardware structure of a computer device according to embodiment four of the present application.

FIG. 7 illustrates a schematic diagram of a hardware structure of a computer device according to an embodiment of the present application. The computer device includes a processor and a memory. The memory stores at least one instruction which is executed by the processor so that the computer device performs the audio data processing method described in the preceding method embodiment.

Referring to FIG. 7, the computer device may include a processor 70, a storage apparatus 71, a display screen 72 having a touch function, an input apparatus 73, an output apparatus 74 and a communication apparatus 75. The storage apparatus 71 as a computer-readable storage medium may be configured to store software programs and computer-executable programs and modules, for example, program instructions/modules corresponding to the embodiment of the present application (for example, the information acquisition module 61, the frequency domain conversion module 62, the audio processing module 63 and the result acquisition module 64 in the audio data processing apparatus provided in the preceding embodiment). The processor 70 executes software programs, instructions and modules stored in the storage apparatus 71 to perform various functional applications and data processing of the computer device, that is, implements the preceding audio data processing method.

In an embodiment, when the processor 70 executes one or more programs stored in the storage apparatus 71, the following operations are performed: acquiring audio data to be processed and a variable-speed rate of at least one audio frame in the audio data; sequentially using the at least one audio frame as a current audio frame to be processed, and converting the current audio frame to a frequency domain; determining a target phase signal of the current audio frame according to a variable-speed rate of the current audio frame and a variable-speed rate of a previous audio frame; and performing, according to the target phase signal, time domain conversion on the current audio frame converted to the frequency domain to obtain a processed current audio frame.

The embodiments of the present application further provide a computer-readable storage medium. When the program in the storage medium is processed by the processor in a computer device, the computer device is caused to perform the audio data processing method in the preceding embodiment. Exemplarily, the audio data processing method in the preceding embodiment includes: acquiring audio data to be processed and a variable-speed rate of at least one audio frame in the audio data; sequentially using the at least one audio frame as a current audio frame to be processed, and converting the current audio frame to a frequency domain; determining a target phase signal of the current audio frame according to a variable-speed rate of the current audio frame and a variable-speed rate of a previous audio frame; and performing, according to the target phase signal, time domain conversion on the current audio frame converted to the frequency domain to obtain a processed current audio frame.

What is claimed is:

1. An audio data processing method, comprising:
   acquiring audio data to be processed and a variable-speed rate of at least one audio frame in the audio data;
   sequentially using the at least one audio frame as a current audio frame to be processed, and converting the current audio frame to a frequency domain;
   determining a target phase signal according to whether a variable-speed rate of the current audio frame is the same as a variable-speed rate of a previous audio frame; and
   performing, according to the target phase signal, time domain conversion on the current audio frame converted to the frequency domain to obtain a processed current audio frame.

2. The method of claim 1, wherein determining the target phase signal according to whether the variable-speed rate of the current audio frame is the same as the variable-speed rate of the previous audio frame comprises:
   obtaining a candidate phase signal of the current audio frame according to the variable-speed rate of the previous audio frame;
   in a case where the variable-speed rate of the current audio frame is the same as the variable-speed rate of the previous audio frame, determining the candidate phase signal as the target phase signal of the current audio frame; and
   in a case where the variable-speed rate of the current audio frame is different from the variable-speed rate of the previous audio frame, determining a compensation phase signal according to the variable-speed rate of the current audio frame and the candidate phase signal, determining the target phase signal of the current audio frame based on the compensation phase signal, and updating a target phase signal of a set number of audio frames before the current audio frame.

3. The method of claim 2, wherein obtaining the candidate phase signal of the current audio frame according to the variable-speed rate of the previous audio frame comprises:
   determining a phase shift amount of the current audio frame according to the variable-speed rate of the previous audio frame, an original phase signal of the previous audio frame and a target phase signal of the previous audio frame; and
   determining the candidate phase signal of the current audio frame according to the phase shift amount and an original phase signal of the current audio frame.

4. The method of claim 3, wherein determining the phase shift amount of the current audio frame according to the variable-speed rate of the previous audio frame, the original phase signal of the previous audio frame and the target phase signal of the previous audio frame comprises:
   determining a phase difference between the current audio frame and the previous audio
   frame according to a phase difference calculation formula $\Delta_i = \zeta + [\varphi_i - \varphi_{i-1} - \zeta]_{2\pi}$, the original phase signal of the current audio frame and the original phase signal of the previous audio frame; and
   determining the phase shift amount of the current audio frame according to a phase shift amount calculation formula $\theta_i = [\psi_{i-1} + r_{i-1}\Delta_i - \varphi_i]_{2\pi}$, the target phase signal of the previous audio frame, the variable-speed rate of the previous audio frame, the original phase signal of the current audio frame and the phase difference;
   wherein $\theta_i$ denotes a phase shift amount of an i-th audio frame, $\Delta_i$ denotes a phase difference between the i-th audio frame and an (i−1)-th audio frame, $\varphi_i$ denotes an original phase signal of the i-th audio frame, $\varphi_{i-1}$ denotes an original phase signal of the (i−1)-th audio frame, $\zeta$ denotes a set phase compensation constant, $\psi_{i-1}$ denotes a target phase signal of the (i−1)-th audio frame, $r_{i-1}$ denotes a variable-speed rate of the (i−1)-th audio frame, and $[.]_{2\pi}$ denotes a modulo of $2\pi$.

5. The method of claim 4, wherein determining the candidate phase signal of the current audio frame according to the phase shift amount and the original phase signal of the current audio frame comprises:
   acquiring an amplitude signal of the current audio frame, and determining at least one amplitude label corresponding to at least one peak point in the amplitude signal respectively;
   determining a peak phase shift amount of the current audio frame according to the phase shift amount and an amplitude label corresponding to each peak point; and
   determining a sum of the original phase signal of the current audio frame and the peak phase shift amount as the candidate phase signal of the current audio frame.

6. The method of claim 4, wherein after acquiring the audio data to be processed, the method further comprises:
   performing overlapping framing of a second frame length on the audio data by using a first frame length as a frame shift so as to obtain the at least one audio frame; and
   recording a first audio signal of a first frame length in each audio frame among the at least one audio frame as a time domain frame corresponding to the each audio frame, and caching at least one time domain frame corresponding to the at least one audio frame to a set cache area.

7. The method of claim 3, wherein determining the candidate phase signal of the current audio frame according to the phase shift amount and the original phase signal of the current audio frame comprises:
   acquiring an amplitude signal of the current audio frame, and determining at least one amplitude label corresponding to at least one peak point in the amplitude signal respectively;
   determining a peak phase shift amount of the current audio frame according to the phase shift amount and an amplitude label corresponding to each peak point; and
   determining a sum of the original phase signal of the current audio frame and the peak phase shift amount as the candidate phase signal of the current audio frame.

8. The method of claim 7, wherein after acquiring the audio data to be processed, the method further comprises:
   performing overlapping framing of a second frame length on the audio data by using a first frame length as a frame shift so as to obtain the at least one audio frame; and
   recording a first audio signal of a first frame length in each audio frame among the at least one audio frame as a time domain frame corresponding to the each audio frame, and caching at least one time domain frame corresponding to the at least one audio frame to a set cache area.

9. The method of claim 3, wherein after acquiring the audio data to be processed, the method further comprises:
   performing overlapping framing of a second frame length on the audio data by using a first frame length as a frame shift so as to obtain the at least one audio frame; and
   recording a first audio signal of a first frame length in each audio frame among the at least one audio frame as a time domain frame corresponding to the each audio frame, and caching at least one time domain frame corresponding to the at least one audio frame to a set cache area.

10. The method of claim 3, further comprising:
performing windowing and summing on the processed current audio frame and previous audio variable-speed data corresponding to the previous audio frame to obtain current audio variable-speed data of the processed current audio frame.

11. The method of claim 2, wherein after acquiring the audio data to be processed, the method further comprises:
performing overlapping framing of a second frame length on the audio data by using a first frame length as a frame shift so as to obtain the at least one audio frame; and
recording a first audio signal of a first frame length in each audio frame among the at least one audio frame as a time domain frame corresponding to the each audio frame, and caching at least one time domain frame corresponding to the at least one audio frame to a set cache area.

12. The method of claim 11, wherein determining the compensation phase signal according to the variable-speed rate of the current audio frame and the candidate phase signal comprises:
acquiring, from the set cache area, a current time domain frame corresponding to the current audio frame and a set number of historical time domain frames before the current time domain frame;
sequentially determining, based on the variable-speed rate of the current audio frame, new candidate phase signals of audio frames corresponding to the set number of historical time domain frames and a new candidate phase signal of the audio frame corresponding to the current time domain frame; and
determining a difference between the new candidate phase signal corresponding to the current audio frame and the candidate phase signal as the compensation phase signal.

13. The method of claim 12, wherein determining the target phase signal of the current audio frame based on the compensation phase signal, and updating the target phase signal of the set number of audio frames before the current audio frame comprises:
determining a sum of the new candidate phase signal of the current audio frame and the compensation phase signal as the target phase signal of the current audio frame; and
determining sums of the new candidate phase signals of the audio frames corresponding to the set number of historical time domain frames and the compensation phase signal as new target phase signals of the set number of audio frames before the current audio frame, respectively.

14. The method of claim 2, further comprising:
performing windowing and summing on the processed current audio frame and previous audio variable-speed data corresponding to the previous audio frame to obtain current audio variable-speed data of the processed current audio frame.

15. The method of claim 1, further comprising:
performing windowing and summing on the processed current audio frame and previous audio variable-speed data corresponding to the previous audio frame to obtain current audio variable-speed data of the processed current audio frame.

16. The method of claim 15, further comprising:
performing smoothing processing on the current audio variable-speed data to obtain smooth audio variable-speed data.

17. The method of claim 16, wherein performing the smoothing processing on the current audio variable-speed data to obtain the smooth audio variable-speed data comprises:
determining a starting position of a signal segment to be smoothed in the current audio variable-speed data and an ending position of the signal segment to be smoothed in the current audio variable-speed data;
determining, according to a set quartic function calculation formula, a target signal strength value and a first derivative of the starting position and a target signal strength value and a first derivative of the ending position; and
forming a smooth curve based on the target signal strength value and the first derivative of the starting position and the target signal strength value and the first derivative of the ending position, and using the smooth curve to replace the signal segment to be smoothed to obtain the smooth audio variable-speed data of the current audio variable-speed data.

18. A computer device, comprising:
at least one processor; and
a storage apparatus, which is configured to store at least one program;
wherein when executing the at least one program, the at least one processor implements the audio data processing method of claim 1.

19. A computer-readable storage medium storing a computer program, wherein when the computer program is executed by a processor, the audio data processing method of claim 1 is implemented.

20. An audio data processing apparatus, comprising:
an information acquisition module, which is configured to acquire audio data to be processed and a variable-speed rate of at least one audio frame in the audio data;
a frequency domain conversion module, which is configured to sequentially use the at least one audio frame as a current audio frame to be processed and convert the current audio frame to a frequency domain;
an audio processing module, which is configured to determine a target phase signal according to whether a variable-speed rate of the current audio frame is the same as a variable-speed rate of a previous audio frame; and
a result acquisition module, which is configured to perform, according to the target phase signal, time domain conversion on the current audio frame converted to the frequency domain to obtain a processed current audio frame.

* * * * *